(12) United States Patent
Morrissett

(10) Patent No.: US 6,218,637 B1
(45) Date of Patent: Apr. 17, 2001

(54) METHOD FOR RESISTANCE WELD GUN GROSS FORCE SELECTION

(75) Inventor: Thomas Morrissett, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/528,321

(22) Filed: Mar. 20, 2000

(51) Int. Cl.[7] .................................................. B23K 71/16
(52) U.S. Cl. .......................................... 219/86.7; 219/91.2
(58) Field of Search .............................. 219/86.7, 86.33, 219/86.41, 86.51, 86.61, 91.1, 91.2

(56) References Cited

U.S. PATENT DOCUMENTS

| | | |
|---|---|---|
| 5,602,341 | 2/1997 | Lee et al. . |
| 5,652,488 * | 7/1997 | Rennau ........................ 219/86.51 |
| 5,883,355 | 3/1999 | Kaneshima . |

* cited by examiner

*Primary Examiner*—Clifford C. Shaw
(74) *Attorney, Agent, or Firm*—Marc Lorelli

(57) ABSTRACT

A method for sizing a weld tool for forming a resistance spot weld to fasten a joint having at least two sheet metal members is provided. The method includes the steps of providing a plurality of weld force curves, determining a governing metal thickness, determining a total thickness of the sheet metal members, determining a plurality of joint parameters, including a weld gap parameter, a thickness parameter, a strength parameter, an equalization parameter and a sheet stiffness parameter, using the plurality of joint parameters to select one of the plurality of weld force curves, and using the governing metal thickness and the selected weld force curve to calculate a weld force parameter.

24 Claims, 7 Drawing Sheets

METHOD FOR RESISTANCE WELD GUN GROSS FORCE SELECTION

BACKGROUND OF THE INVENTION

1. Technical Field

The present invention relates generally to weld tools for resistance spot welding a joint having two or more sheet metal members and more particularly to a method for sizing weld tools.

2. Discussion

Modern automotive development processes typically employ cross-functional teams having members with diverse backgrounds to review decisions related to the design and manufacture of various components. The diverse backgrounds provides a relatively small team with a broad understanding of almost all of the aspects that are relevant to the design, manufacture and use of the particular component. Accordingly, cross-functional teams have been instrumental in the shortening of the cycle times for developing and producing a vehicle in that the team is frequently able to identify problems and risks in proposed designs and processes prior to physical construction of the vehicle or any related tooling.

While cross-functional teams have made significant advancements, several drawbacks have been identified. One drawback concerns the need for a preliminary design having sufficient detail to properly convey the design concept of the component to team members or tooling suppliers. In the case of sheet metal fabrications, such as vehicle bodies, the design effort undertaken to sufficiently detail a given design for presentation to a cross-function team constitutes a majority of the overall effort required to completely design the sheet metal fabrication to completion. As such, the design of the sheet metal fabrication may be relatively mature prior to the disclosure of the design to the team members, eliminating or substantially impairing the option to introduce significant changes in the design should a notable problem be identified by the cross-functional team.

In particular, problems are routinely encountered with the sizing of weld tools for resistance spot welding the sheet metal members of a joint together. These problems arise when aspects of the design of the joint or the manufacturing process are not fully understood or compensated for in the design process. These aspects include, for example, the ability of the weld tool to equalize to the joint or the need to deflect one or more of the sheet metal members forming the joint into abutment prior to forming the spot weld. The additional force required in such situations often overstresses the weld tool and significantly reduces its useful life.

To avoid reducing the life of a weld tool, it would seem rather obvious to simply procure a larger weld tool for the operation. This alternative, however, is frequently not a viable option due to space constraints that result from the design of the sheet metal fabrication and to a lesser extent, machine tool capabilities. Even where a larger weld tool can be implemented, the machine tool used to orient the weld tool is frequently not sized to handle the additional weight of the larger tool and as such, this change negatively impacts the performance of the machine tool (due to increased inertia and weight) as well as its durability.

Accordingly, there remains a need in the art for a quick, efficient and accurate method for sizing weld tools for resistance spot welding a joint having a plurality of sheet metal members.

SUMMARY OF THE INVENTION

It is one object of the present invention to provide a method for calculating a weld force index for sizing a weld tool for resistance spot welding a joint.

It is another object of the present invention to provide a method for calculating a weld force index for sizing a resistance spot weld tool which utilizes a series of predetermined parameters for performing the calculation.

A method for mechanically sizing a weld tool for forming a resistance spot weld to fasten a joint having at least two sheet metal members is provided. The method includes the steps of providing a plurality of weld force curves, determining a governing metal thickness, determining a total thickness of the sheet metal members, determining a plurality of joint parameters, including a weld gap parameter, a thickness parameter, a strength parameter, an equalization parameter and a sheet stiffness parameter, using the plurality of joint parameters to select one of the plurality of weld force curves, and using the governing metal thickness and the selected weld force curve to calculate a weld force parameter.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
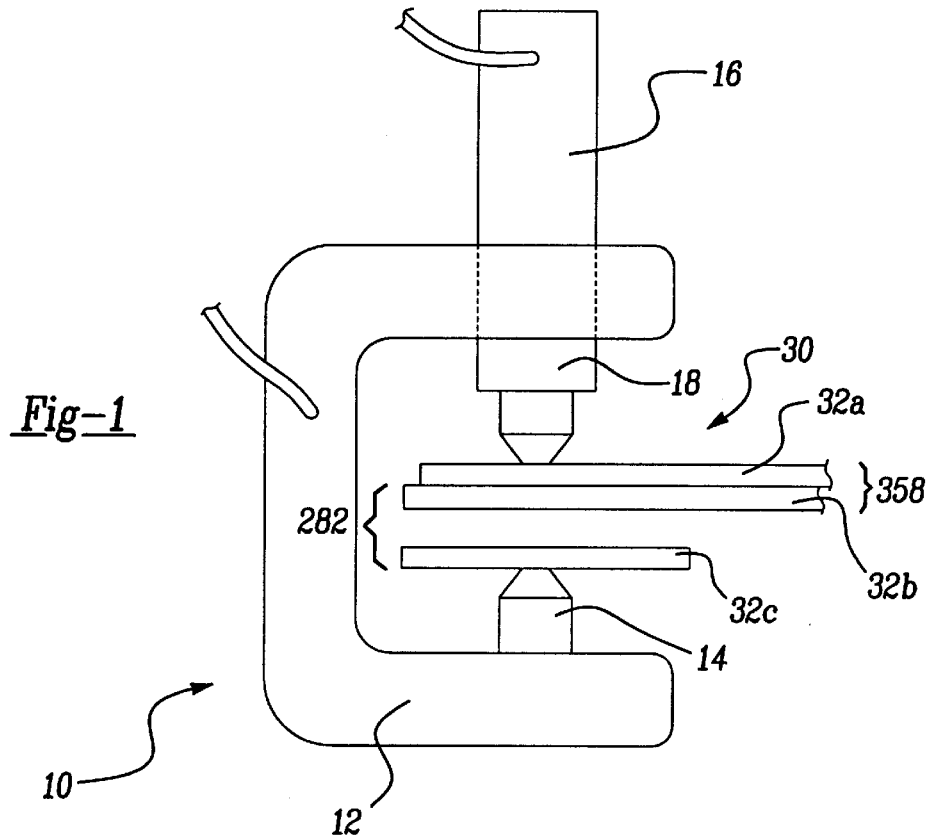
FIG. 1 is a schematic illustration of a device being welded with a conventional resistance spot weld tool.

In FIG. 1, a conventional weld tool is generally indicated by reference numeral 10. Weld tool 10 is illustrated as having a generally C-shaped structural frame 12, a first electrode 14, a transport mechanism 16 and a second electrode 18. Although a particular type of weld tool is illustrated as a "C" type weld gun, it will be understood that the teachings of the present invention have applicability to other types of weld tools, including but not limited to pinch guns and scissors guns. Mechanically, first electrode 14 is fixedly but removably coupled to frame 12. First electrode 14 is also electrically coupled to frame 12. Transport mechanism 16 is fixedly coupled to frame 12 but electrically isolated therefrom. Second electrode 18 is fixedly but removably coupled to transport mechanism 16 but is electrically isolated therefrom. Transport mechanism 16 includes a pneumatic cylinder or clamp (not specifically shown) which permits second electrode 18 to be moved relative to first electrode 14. As is well known in the art, transport mechanism 16 may alternatively include an electrically or hydraulically operated clamp or cylinder.

Weld tool 10 is operable for resistance spot welding a joint 30 comprised of two or more sheet metal members 32 together. With the particular weld tool illustrated, first electrode 14 is typically positioned so as to abut sheet metal member 32c and transport mechanism 16 is actuated to extend second electrode 18 toward first electrode 14 to exert a clamping force through joint 30. A high current electric charge is then passed through the first and second electrodes 14, 18 which causes the formation of a resistance spot weld. Of important note in this example is the fact that first electrode 14 is brought into abutment with sheet metal member 32c without causing deflection in one or more of the sheet metal members 32 forming joint 30 in excess of a predetermined amount. Weld tool 10 is said to have perfect equalizing capability.

Figure 2A:
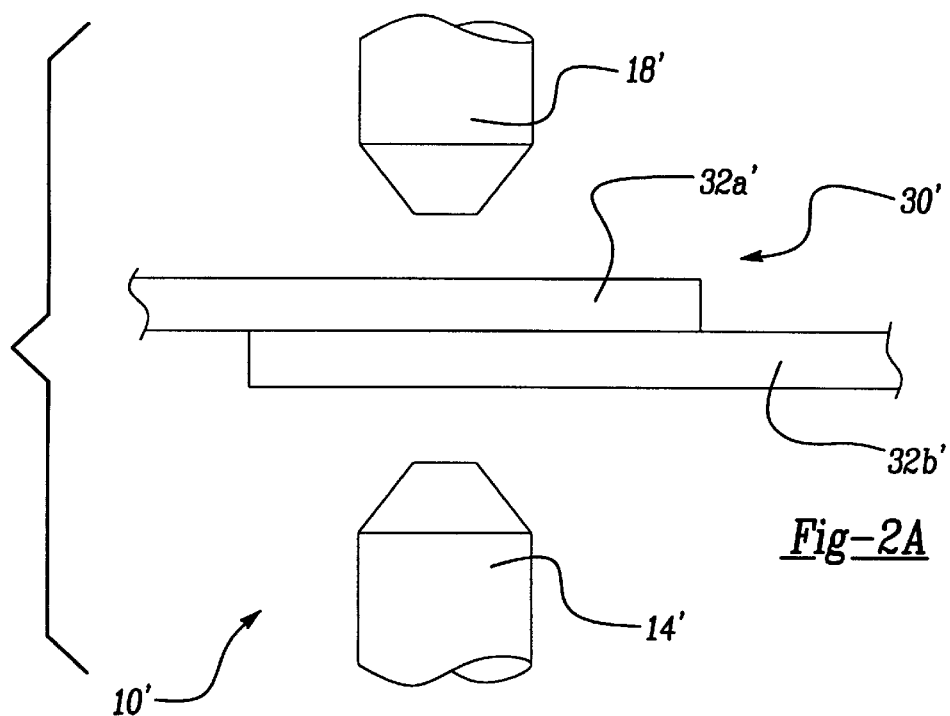
FIGS. 2a and 2b are schematic illustrations of a resistance weld tool having equalizing capability but whose actuation causes deflection in the joint to be welded.
Figure 2B:
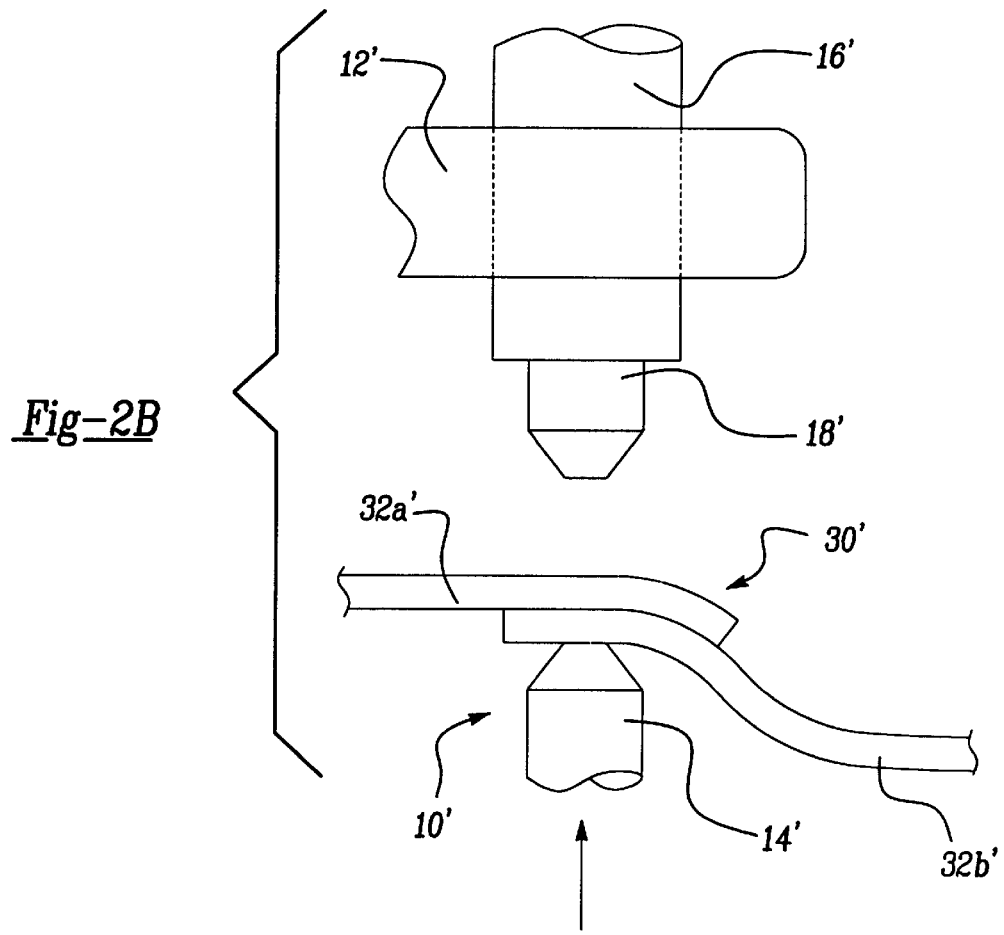

Referring to FIGS. 2a and 2b, an alternate weld tool 10' is illustrated. When a locating force is exerted to the first electrode 14' to bring it into abutment with sheet metal member 32b', the locating force is shown to cause deflection in the sheet metal members 32' in excess of a predetermined amount. Weld tool 10' is said to have an equalizing capability which causes deflection in excess of a predetermined amount. The same type of condition may also result when the spring constant associated with the transport mechanism 16' and its associated second electrode 18' is greater than the spring constant of the joint 30', causing the transport mechanism 16' to bend the sheet metal members 32' toward the first electrode 14' rather than drawing first electrode 14' into abutment with the sheet metal members 32'.

Figure 3:
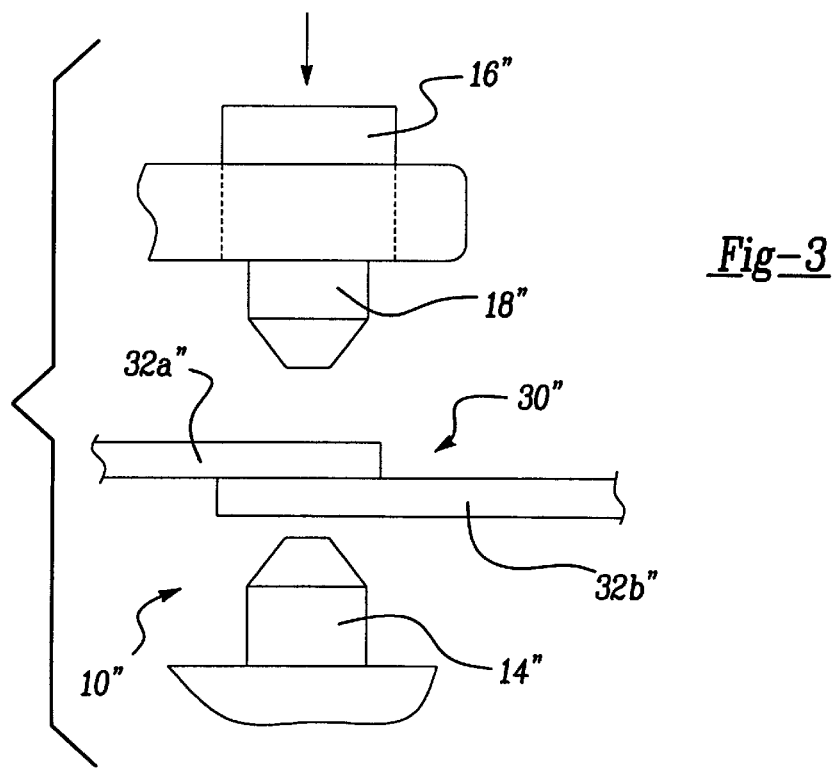
FIG. 3 is a schematic illustration of a resistance weld tool having no equalizing capability.
Figure 4A:
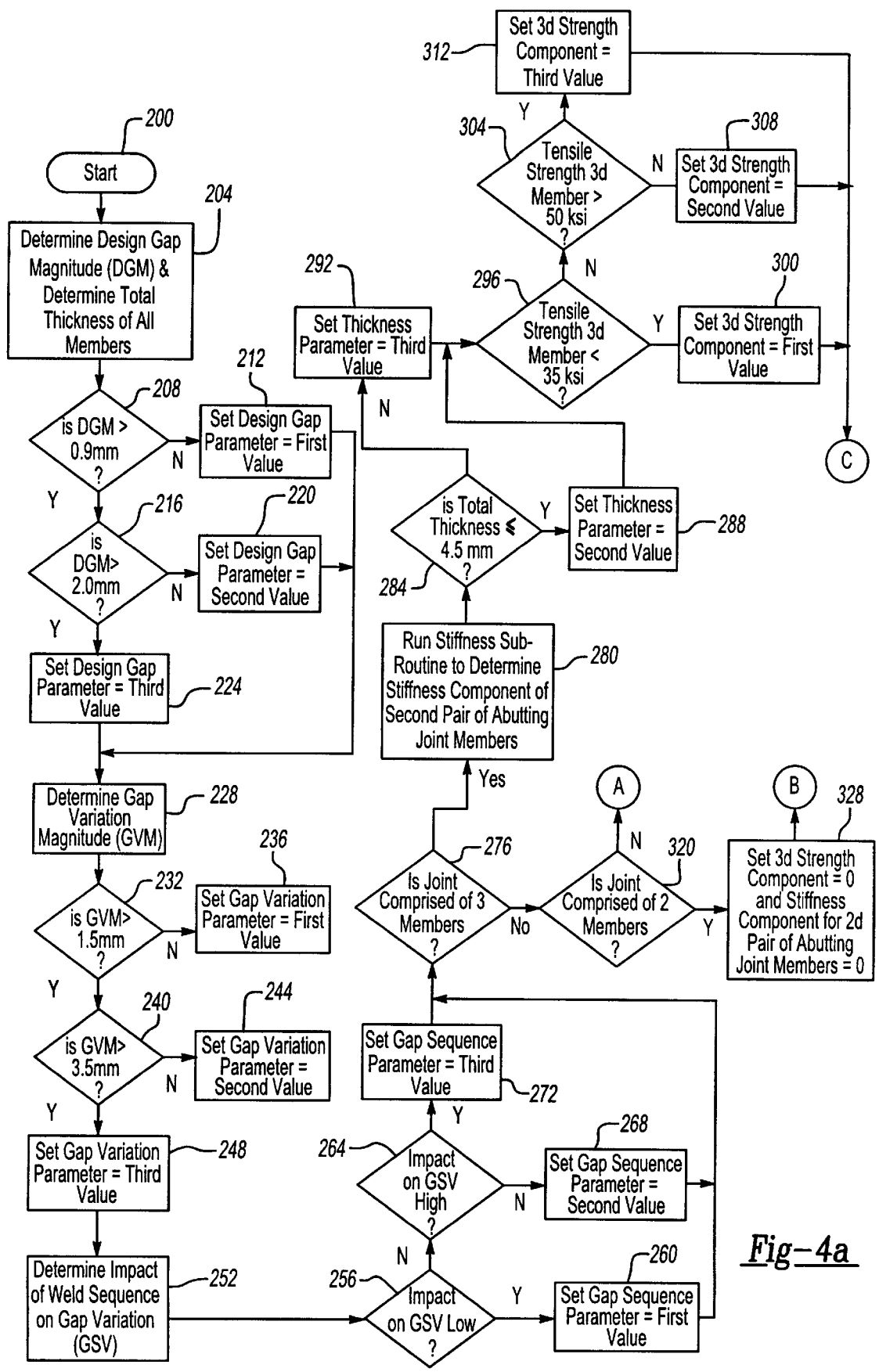
FIGS. 4a through 4d are schematic diagrams of a method according to the teachings of the present invention in flowchart form.
Figure 4B:
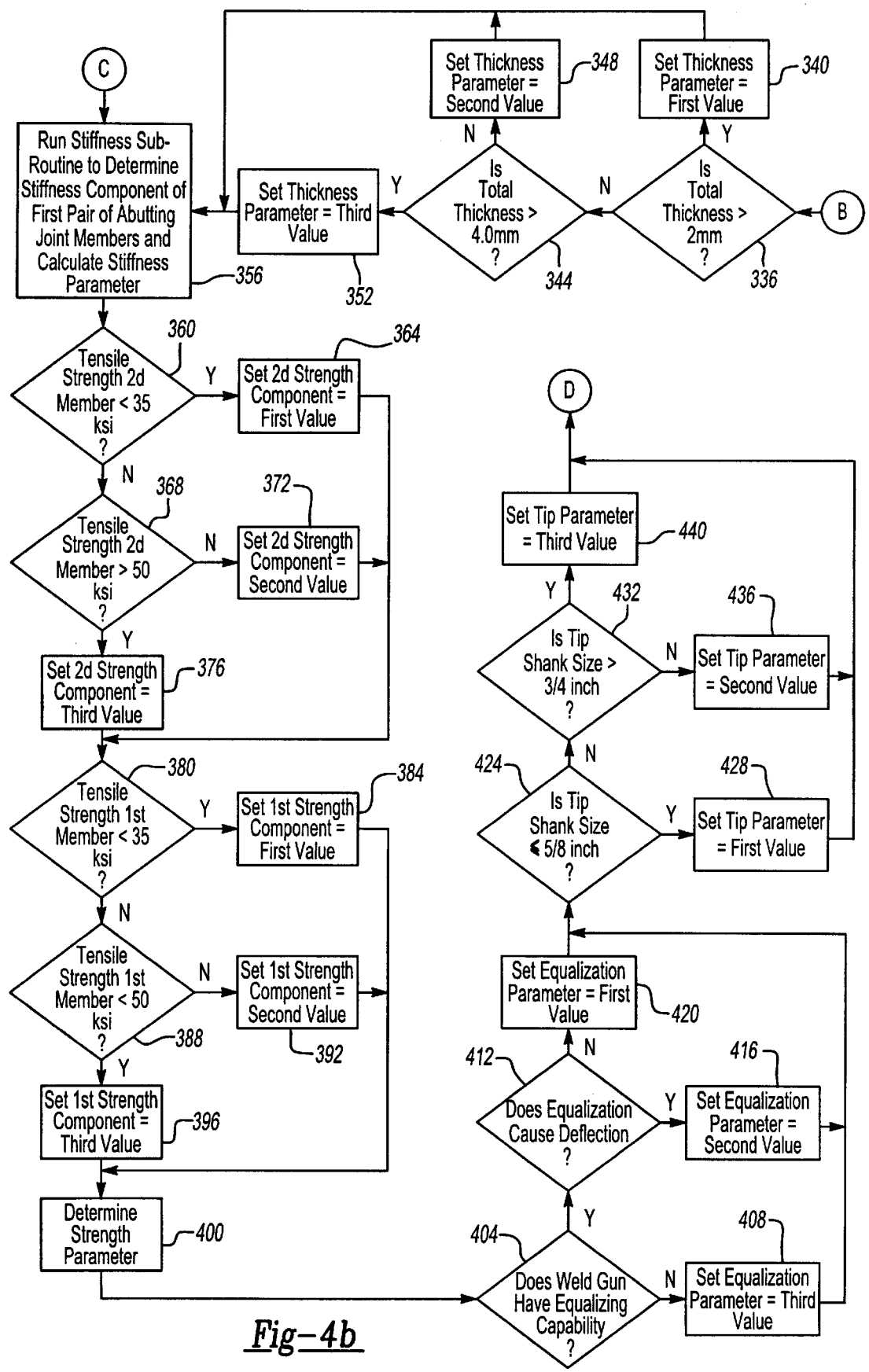
Figure 4C:
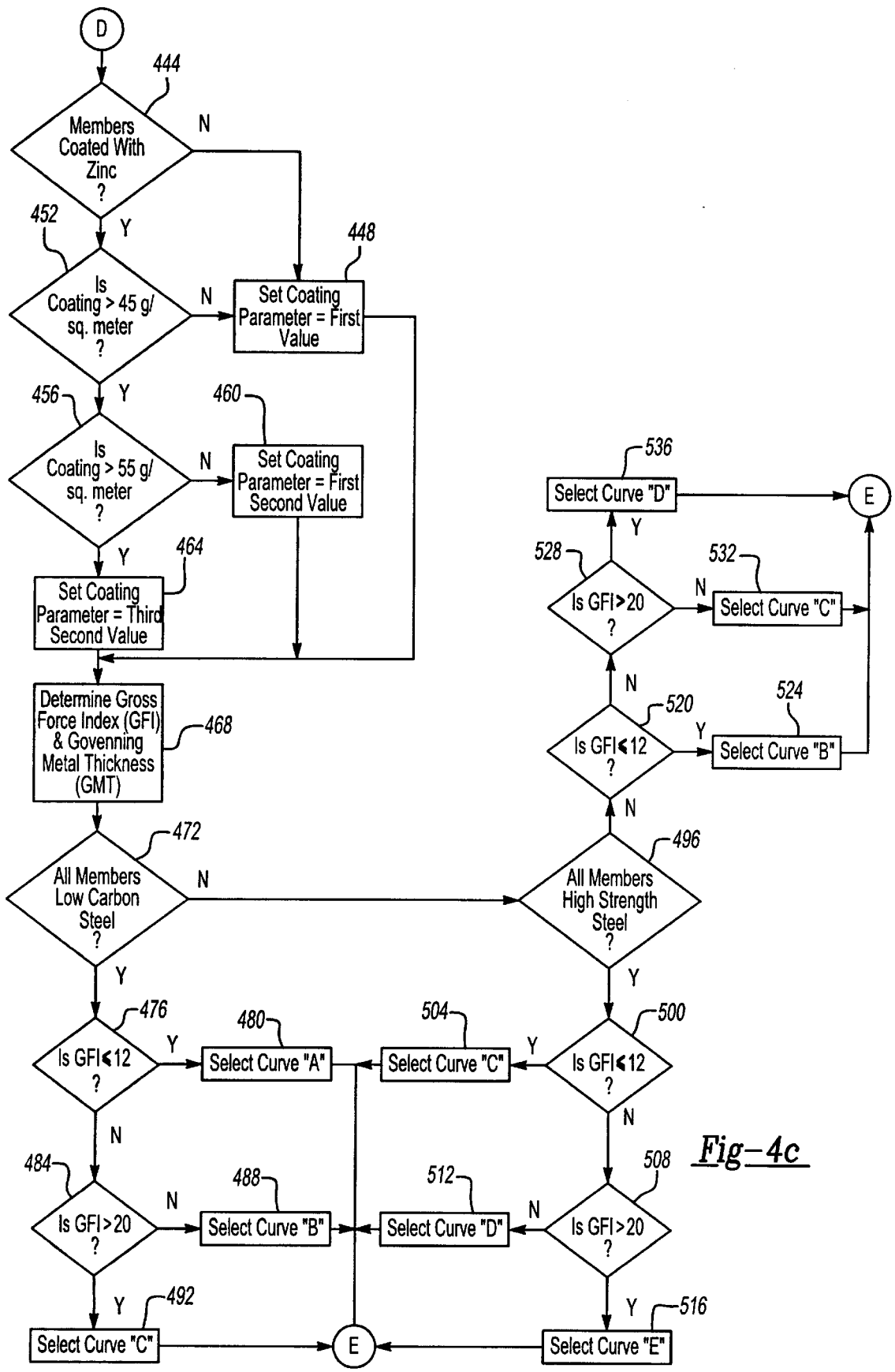

Referring to FIG. 3, a second alternate weld tool 10" is illustrated. First electrode 14" is fixed and cannot be brought into abutment with sheet metal member 32b". Rather, a force must be exerted through second electrode 18" which is sufficient in magnitude to include not only the desired clamping force for performing the resistance spot weld, but also a sufficient locating force to deflect the sheet metal members 32" of joint 30" to bring sheet metal member 32b" into abutment with fixed electrode 14". Weld tool 10" is said to have no equalizing capability.

In FIGS. 4a through 4d, a method according to the teachings of the present invention is shown in flowchart form. The methodology is entered at bubble 200 and begins to determine a gap parameter. In the particular embodiment illustrated, the gap parameter includes three components: a design gap parameter, a maximum gap due to panel variation parameter and a gap sequence parameter. Each of these parameters will be discussed in detail below.

The methodology progresses to block 204 where it determines the design gap magnitude (DGM) and the total thickness of all the sheet metal members 32 which make up joint 30. The DGM is the nominally designed distance between the sheet metal members 32. In cases where each of the sheet metal members 32 is designed to abut one another, the DGM is zero. The total thickness of all the sheet metal members 32 is simply the sum of the thicknesses for each sheet metal member. In the example provided above, the thickness of the first sheet metal member 32a is 1.25 mm, the thickness of the second sheet metal member 32b is 1.75 mm and the thickness of the third sheet metal member 32c is 1.50 mm and as such, the total thickness is 4.50 mm.

The methodology next proceeds to decision block 208 where the magnitude of the DGM is evaluated. If the DGM is not greater than 0.9 mm, the methodology proceeds to block 212 where the design gap parameter is set to a predetermined first value. The methodology then proceeds to block 228. Returning to decision block 208, if the DGM is greater than 0.9 mm, the methodology advances to decision block 216 where the methodology determines if the DGM exceeds 2.0 mm. It the DDGM does not exceed 2.0 mm, the methodology progresses to block 220 where the design gap parameter is set to a second value. The methodology then proceeds to block 228. Returning to decision block 216, it the DGM exceeds 2.0 mm, the methodology proceeds to block 224 where the design gap parameter is set to a third value. The methodology then advances to block 228.

In block 228 the methodology determines the maximum gap due to panel variation (GVM). The GVM is the maximum actual gap permitted. The methodology proceeds to block 232 where the methodology evaluates the GVM. If the GVM is not greater than 1.5 mm, the methodology proceeds to block 236 where the maximum gap due to panel variation parameter is set to a first value. The methodology then proceeds to block 252. In decision block 232, if the GVM is greater than 1.5 mm, the methodology proceeds to decision block 240 where the methodology determines if the GVM is greater than 3.5 mm. If the GVM is not greater than 3.5 mm, the methodology proceeds to block 244 and sets the maximum gap due to panel variation parameter equal to a second value. The methodology then proceeds to block 252. Returning to decision block 240, if the GVM is greater than 3.5 mm, the methodology proceeds to block 248 and sets the maximum gap due to panel variation parameter to a third value. The methodology proceeds to block 252.

In block 252, the methodology determines the effect of the weld sequence on the gap creation (GSV). Weld sequence may negatively affect gap creation if one or more of the sheet metal members 32 buckles or otherwise deforms during the welding process. The methodology then progresses to decision block 256 where the impact on GSV is quantified. If the welding process has a low effect on GSV, the methodology proceeds to block 260 and sets the gap sequence parameter equal to a first value. The methodology then proceeds to decision block 276. Returning to decision block 256, if the welding process does not have a low effect on GSV, the methodology proceeds to block 264 where the methodology determines if the effect on GSV is high. If the effect on GSV is not high in decision block 264, the methodology proceeds to block 268 and sets the gap sequence parameter equal to a second value. The methodology then proceeds to decision block 276. In decision block 264, if the welding process does have a high effect on GSV, the methodology proceeds to block 272 and sets the gap sequence parameter to a third value. The methodology then proceeds to decision block 276.

In decision block 276 the methodology determines the quantity of sheet metal members 32 which comprise joint 30. If joint 30 is comprised of three sheet metal members 32, the methodology proceeds to block 280 and determines the stiffness component for the second pair of abutting sheet metal members 282 (i.e., sheet metal members 32b and 32c. In the example provided, the stiffness component for each pair of abutting sheet metal members 32 is obtained through a stiffness subroutine that is schematically illustrated in flowchart form in FIG. 5.

Figure 5:
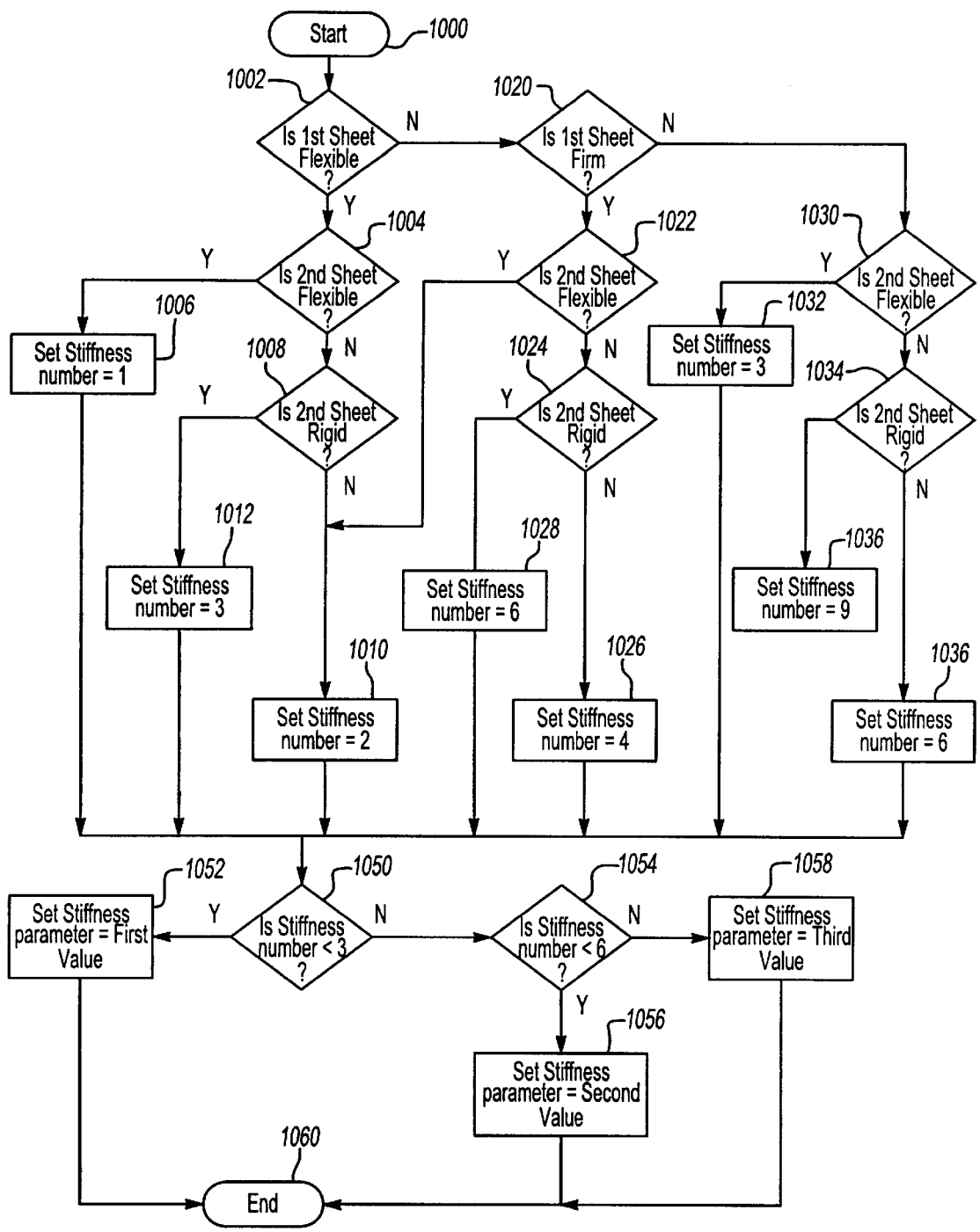
FIG. 5 is a schematic diagram of a method for calculating a stiffness component for a pair of abutting joint members illustrated in flowchart form.

In FIG. 5, the subroutine is entered at bubble 1000 and progresses to decision block 1002 where the methodology determines if the first sheet in the pair of abutting sheet metal members is flexible. The term "flexible" is used where about 5 pounds of force (i.e., finger pressure) is adequate to push the particular sheet metal member 32 into abutment with the opposed sheet metal member 32. If the first sheet is flexible, the methodology proceeds to decision block 1004 where the methodology determines whether the second sheet in the pair of abutting sheet metal members is flexible. If the second sheet is also flexible, the methodology proceeds to block 1006 and sets a stiffness value equal to 1. The methodology then proceeds to decision block 1050.

Returning to decision block 1004, if the second sheet is not flexible, the methodology proceeds to decision block 1008 where the methodology determines if the second sheet is rigid. The term "firm" is used where moderate clamping force, such as a force which does not exceed one tenth (10%) of the recommended resistance spot weld clamping force, is required to push the particular sheet metal member 32 into abutment with the opposed sheet metal member 32. The term "rigid" is used where a clamping force in excess of a moderate clamping force is required to bring the particular sheet metal member 32 in to abutment with the opposed sheet metal member 32. In the embodiment of the invention illustrated, if a sheet metal member is neither flexible nor firm, it will be classified as rigid. If the second sheet is not rigid, the methodology proceeds to block 1010 and sets the stiffness value equal to 2. The methodology then proceeds to decision block 1050. If, however, the second sheet is rigid in decision block 1008, the methodology proceeds to block 1012 and sets the stiffness value equal to 3. The methodology then proceeds to decision block 1050.

Returning to decision block 1002, if the first sheet is not flexible, the methodology proceeds to decision block 1020 where the methodology determines if the first sheet is firm. If the first sheet is firm, the methodology proceeds to decision block 1022 where it determines whether the second sheet is flexible. If the second sheet is flexible in decision block 1022, the methodology proceeds to block 1010 and sets the stiffness value as discussed above. If, however, the second sheet is not flexible in decision block 1022, the methodology proceeds to decision block 1024 where it determines whether the second sheet is rigid. If the second sheet is not rigid in block 1024, the methodology proceeds to block 1026 where the stiffness value is set to 4. The methodology then proceeds to decision block 1050. If the second sheet is rigid in decision block 1024, the methodology proceeds to block 1028 where the stiffness value is set to 6. The methodology then proceeds to decision block 1050.

Returning to decision block 1020, if the first sheet is not firm, the methodology proceeds to decision block 1030 and determines whether the second sheet is flexible. If the second sheet is flexible, the methodology proceeds to block 1032 and sets the stiffness value to 3. The methodology then proceeds to decision block 1050. If, however, the methodology determines that the second sheet is not flexible in decision block 1030, the methodology proceeds to decision block 1034 where it determines whether the second sheet is rigid.

If the second sheet is not rigid in decision block 1034, the methodology proceeds to block 1036 where the stiffness value is set to 6. The methodology then proceeds to decision block 1050. If the second sheet is rigid in decision block 1034, the methodology proceeds to block 1038 where the stiffness value is set to 9. The methodology proceeds to decision block 1050.

In decision block 1050, the methodology determines if the stiffness value is less than a first predetermined value. If the stiffness value is less than a first predetermined value, such as 3, the methodology proceeds to block 1052 where the stiffness parameter is set to a first value. The methodology then proceeds to bubble 1060 where the subroutine terminates. Returning to decision block 1050, if the stiffness value is not less than the first predetermined value, the methodology proceeds to block 1054 and determines if the stiffness number is less than a second predetermined value. If the stiffness value is less than a second predetermined value, such as 6, the methodology proceeds to block 1056 where the stiffness parameter is set to a second value. The methodology then proceeds to bubble 1060. If the stiffness value is not less than the second predetermined value, the methodology proceeds to block 1058 where the stiffness parameter is set to a third value. The methodology then proceeds to bubble 1060 and terminates where it reenters the main methodology.

The methodology next proceeds to decision block 284 where the total thickness of the sheet metal members 32 is evaluated. If the total thickness is less than or equal to 4.5 mm, the methodology proceeds to block 288 where the thickness parameter is set to a second value. The methodology then proceeds to decision block 296. Returning to decision block 284, if the total thickness is not less than or equal to 4.5 mm, the methodology proceeds to block 292 and sets the thickness parameter to a third value. The methodology then proceeds to decision block 296.

In decision block 296 the methodology next evaluates the tensile strength of the third sheet metal member 32c. If the tensile strength of the third sheet metal member is less than 35,000 lbs. (35 ksi), the methodology proceeds to block 300 where the third strength component is set to a first value. The methodology then proceeds to block 356. Returning to decision block 296, if the tensile strength of the third sheet metal member 32c is greater than 35,000 lbs, the methodology proceeds to decision block 304.

In decision block 304, if the tensile strength of the third sheet metal member 32c is not greater than 50,000 lbs (50 ksi), the methodology proceeds to block 308 where the third strength component is set to a second value. The methodology then proceeds to block 356. If in decision block 304 the tensile strength of the third sheet metal member 32c is greater than 50,000 lbs, the methodology proceeds to block 312 where the third strength component is set to a third value. The methodology then proceeds to block 356.

Returning to decision block 276, if the joint 30 is not comprised of three sheet metal members 32, the methodology proceeds to decision block 320 and determines if the joint is comprised of two sheet metal members 32. If the joint is not comprised of two sheet metal members 32, the methodology proceeds to bubble 600 where the methodology terminates. If the joint is comprised of two sheet metal members 32 in decision block 320, the methodology proceeds to block 328 where the third strength component and the stiffness component for the second pair of abutting joint members are both set to zero (0). The methodology proceeds to decision block 336.

In decision block 336 the methodology evaluates the total thickness of the sheet metal members 32 forming the joint 30. If the total thickness is less than 2.0 mm, the methodology proceeds to block 340 where the thickness parameter is set to a first value. The methodology then proceeds to block 356. If the total thickness is not less than 2.0 in decision block 336, the methodology proceeds to decision block 344. If the total thickness is not greater than 4.0 mm in decision block 344, the methodology proceeds to block 348 where the thickness parameter is set to a second value. The methodology then proceeds to block 356. In block 344, if the total thickness is greater than 4.0 mm, the methodology proceeds to block 352 where the thickness parameter is set to a third value. The methodology then proceeds to block 356.

In block 356 the methodology employs the stiffness subroutine that is discussed in detail above to determine the stiffness component for the first pair of abutting joint members 358 (i.e., sheet metal members 32a and 32b). The methodology also determines a stiffness parameter for the joint 30. The stiffness parameter for the joint 30 is calculated by adding the stiffness components for the first and second pair of abutting joint members. The methodology next proceeds to decision block 360 where the tensile strength of the second sheet metal member 32b is evaluated.

If the tensile strength of the second sheet metal member 32b is less than 35,000 lbs. (35 ksi), the methodology proceeds to block 364 where the second strength component is set to a first value. The methodology then proceeds to decision block 380. Returning to decision block 360, if the tensile strength of the second sheet metal member 32b is greater than 35,000 lbs., the methodology proceeds to decision block 368.

In decision block 368, if the tensile strength of the second sheet metal member 32b is not greater than 50,000 lbs. (50 ksi), the methodology proceeds to block 372 where the second strength component is set to a second value. The methodology then proceeds to block 380. If in decision block 368 the tensile strength of the second sheet metal member 32b is greater than 50,000 lbs., the methodology proceeds to block 376 where the second strength component is set to a third value. The methodology then proceeds to block 380.

In decision block 380 the methodology next evaluates the tensile strength of the first sheet metal member 32a. If the tensile strength of the first sheet metal member is less than 35,000 lbs. (35 ksi), the methodology proceeds to block 384 where the first strength component is set to a first value. The methodology then proceeds to block 400. Returning to decision block 380, if the tensile strength of the first sheet metal member 32a is greater than 35,000 lbs., the methodology proceeds to decision block 388.

In decision block 388, if the tensile strength of the first sheet metal member 32a is not greater than 50,000 lbs. (50 ksi), the methodology proceeds to block 392 where the first strength component is set to a second value. The methodology then proceeds to block 400. If in decision block 388 the tensile strength of the first sheet metal member 32a is greater than 50,000 lbs., the methodology proceeds to block 396 where the first strength component is set to a third value. The methodology then proceeds to block 400.

In block 400 the strength parameter is calculated. In the particular embodiment illustrated, the strength parameter is simply the sum of the first, second and third strength components. The methodology then proceeds to decision block 404 where the positioning or equalizing capability of the weld tool 10 is evaluated.

If the weld tool 10 does not include an equalizing capability, such that neither the first or second electrodes 14 and 18 are brought into abutment with one of the sheet metal members 32 while actuating the weld tool 10 to exert a clamping force to the sheet metal members 32, the methodology proceeds to block 408 where the equalization parameter is set to a third value. The methodology next proceeds to decision block 424. Returning to decision block 404, if the weld tool 10 does include an equalizing capability such that one of the first and second electrodes 14 and 18 are brought into abutment with one of the sheet metal members while actuating the weld tool 10 to exert a clamping force to the sheet metal members 32, the methodology proceeds to decision block 412.

In decision block 412, the methodology determines the extent to which a locating force for causing the first electrode to abut one of the sheet metal members 32 impacts the joint 30. If the locating force applied through first electrode 14 causes deflection in one or more of the sheet metal members 32 in excess of a predetermined amount while actuating the weld tool 10 to exert a clamping force to the sheet metal members 32, the methodology proceeds to block 416 and sets the equalization parameter to a second value. The methodology then proceeds to decision block 424. Returning to decision block 412, if the locating force applied through first electrode 14 does not cause deflection in one or more of the sheet metal members 32 in excess of a predetermined amount prior to actuating the weld tool 10 to exert a clamping force to the sheet metal members 32, the methodology proceeds to block 420 and sets the equalization parameter to a first value. The methodology then proceeds to decision block 424.

In decision block 424 the methodology evaluates the tip shank diameter of the electrodes. If the tip shank diameter of any of the electrodes is less than or equal to about ⅝-inch diameter, the methodology proceeds to block 428 where the tip parameter is set to a first value. The methodology then proceeds to decision block 444. Referring back to decision block 424, if neither of the electrodes has a tip shank diameter which is less than or equal to ⅝ inch, the methodology proceeds to decision block 432. In decision block 432, if the tip shank diameter of both of the electrodes does not exceed ¾ inch, the methodology proceeds to block 436 where the tip parameter is set to a second value. The methodology then proceeds to decision block 444. Returning to decision block 432, if the tip shank diameter of both of the electrodes exceeds ¾ inch in diameter, the methodology proceeds to block 440 where the tip parameter is set to a third value. The methodology next proceeds to decision block 444.

In decision block 444, the methodology determines whether any of the sheet metal members 32 has been coated with a zinc coating. If none of the sheet metal members has been coated with a zinc coating, the methodology proceeds to block 448 where the coating parameter is set to a first value. The methodology then proceeds to block 468.

Returning to decision block 444, if any of the sheet metal members 32 has been coated with a zinc coating, the methodology proceeds to decision block 452 where the methodology determines if any of the sheet metal members 32 have a zinc coating with a weight/area in excess of a first predetermined threshold. In the particular example disclosed, the first predetermined threshold is 45 grams per square meter. If none of the sheet metal members 32 have been coated with a zinc coating having a weight/area in excess of the first predetermined threshold, the methodology proceeds to block 448.

If any of the sheet metal members has a zinc coating with a weight/area in excess of the first predetermined threshold in decision block 452, the methodology proceeds to decision block 456 where the methodology determines if any of the sheet metal members 32 have a zinc coating with a weight/area in excess of a second predetermined threshold. In the particular example disclosed, the second predetermined threshold is 55 grams per square meter. If none of the sheet metal members 32 has been coated with a zinc coating having a weight/area in excess of the second predetermined threshold, the methodology proceeds to block 460 where the coating parameter is set to a second value. The methodology then proceeds to block 468.

If any of the sheet metal members has a zinc coating with a weight/area in excess of the second predetermined threshold in decision block 452, the methodology proceeds to block 464 where the coating parameter is set to a third value. The methodology then proceeds to block 468.

In block 468, the methodology determines the gross force index and the governing metal thickness. In the example provided, the gross force is the numeric total of each of the parameters. In this regard, various parameters may be weighted equally to have equal impact or weighted differently to provide selected parameters with more importance relative to other parameters. Differential weighting may therefore be employed to completely factor out parameters such as the coating parameter or the tip parameter, which although are strongly related to the difficulty in welding a joint, but only weakly related to the sizing of a weld tool 10. In the particular embodiment illustrated, each of the parameters is weighted equally, with the first value being equal to one (1), the second value being equal to two (2) and the third value being equal to three (3).

In a joint formed by two sheet metal members, the governing metal thickness (GMT) is simply the thinnest sheet metal member 32 which forms the joint. In a joint formed by three sheet metal members, the GMT is the intermediate thickness of the sheet metal members. In the particular example provided, 1.50 mm is the governing metal thickness because the joint 30 is formed by three sheet metal members 32 and the third sheet metal member 32c is the sheet metal member having the intermediate thickness. The methodology next proceeds to decision block 472.

If all of the sheet metal members 32 forming the joint 30 are low carbon steel in decision block 472, the methodology proceeds to decision block 476 where the methodology determines if the GFI is less than or equal to 12. If the GFI is less than or equal to 12, the methodology proceeds to block 480 and selects weld curve "A". The methodology then proceeds to decision block 540. If the GFI is greater than 12 in decision block 476, the methodology proceeds to decision block 484. If the GFI is not greater than 20 in decision block 484, the methodology proceeds to block 488 and selects weld curve "B". The methodology then proceeds to decision block 540. If the GFI is greater than 20 in decision block 484, the methodology proceeds to block 492 and selects weld curve "C". The methodology then proceeds to decision block 540.

Returning to decision block 472, if all of the sheet metal members 32 forming joint 30 are not low carbon steel, the methodology proceeds to block 496 and determines if all of the sheet metal members 32 are high strength steel. If all of the sheet metal members are high strength steel, the methodology proceeds to decision block 500 and determines whether the GFI is less than or equal to 12. If the GFI is less than or equal to 12, the methodology proceeds to block 504 and selects weld curve "C". The methodology then proceeds to decision block 540. If the GFI is greater than 12 in decision block 500, the methodology proceeds to decision block 508. If the GFI is not greater than 20 in decision block 508, the methodology proceeds to block 512 and selects weld curve "D". The methodology then proceeds to decision block 540. If the GFI is greater than 20 in decision block 508, the methodology proceeds to block 516 and selects weld curve "E". The methodology then proceeds to decision block 540.

Referring back to decision block 496, if all of the sheet metal members 32 forming joint 30 are not high strength steel, the methodology proceeds to decision block 520. In decision block 520, the methodology determines whether the GFI is less than or equal to 12. If the GFI is less than or equal to 12, the methodology proceeds to block 524 and selects weld curve "B". The methodology then proceeds to decision block 540. If the GFI is greater than 12 in decision block 520, the methodology proceeds to decision block 528.

If the GFI is not greater than 20 in decision block 528, the methodology proceeds to block 532 and selects weld curve "C". The methodology then proceeds to decision block 540. If the GFI is greater than 20 in decision block 528, the methodology proceeds to block 536 and selects weld curve "D". The methodology then proceeds to decision block 540.

Figure 6:
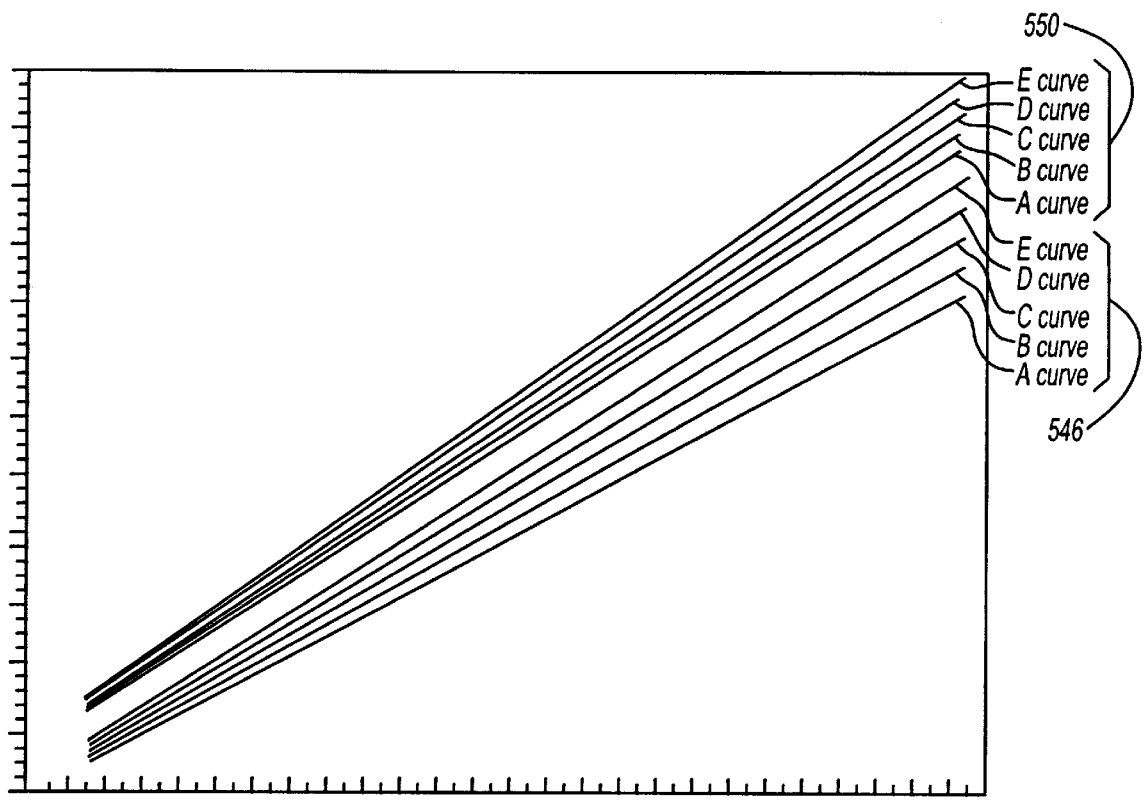
FIG. 6 is a chart showing various weld curves.
Figure 4D:
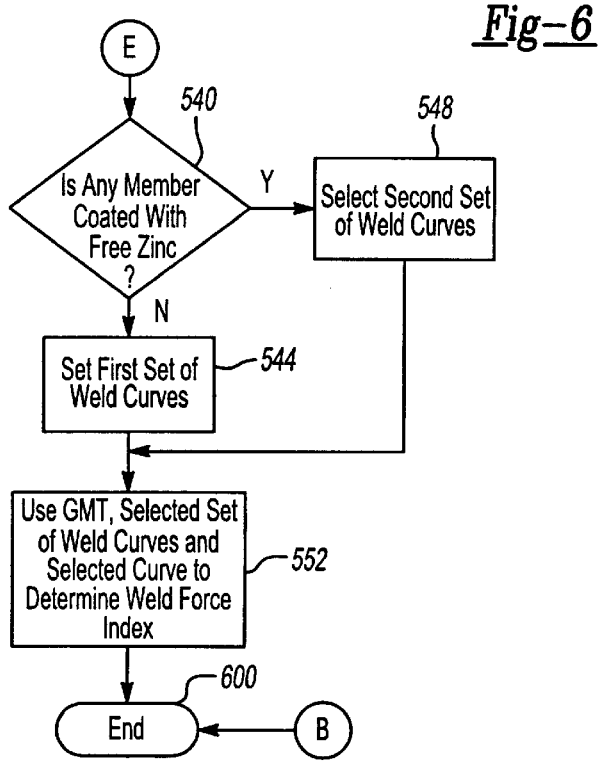

In block 540 the methodology determines if any of the sheet metal members 32 forming the joint 30 are coated with a free zinc coating (i.e., a non-alloyed zinc coating). If none of the sheet metal members 32 are coated with a free zinc coating (e.g., the sheet metal members may be uncoated or "bare", or may be coated with an iron-zinc coating), the methodology proceeds to block 544 and selects a first set of weld curves, such first weld curve set 546 illustrated in FIG. 6. The methodology then proceeds to block 552. If any of the sheet metal members 32 are coated with a free zinc coating in decision block 540, the methodology proceeds to block 548 and selects a second set of weld curves, such as second weld curve set 550, also illustrated in FIG. 6. The methodology then proceeds to block 552.

In block 552, the methodology uses GMT, the selected set of weld curves and the selected weld curve to interpolate a weld force index. The weld force index is to be used to size a weld tool 10 for resistance spot welding the joint 30 analyzed and ensures that the weld tool 10 will be sized in a robust manner to provide a desired level of reliability yet will not be grossly oversized so as to interfere with the design or manufacture of the joint 30. Accordingly, it is presently preferred that the weld force index be calculated as a gross weld force value, having units in pounds (force) or Newtons. The methodology then proceeds to bubble 600 and terminates.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

I claim:

1. A method for sizing a weld tool for forming a resistance spot weld to fasten a joint having at least two sheet metal members together, the weld tool having a body portion, a first electrode fixed to the body portion, and a second electrode coupled to the body portion and movable in position relative to the first electrode, the method comprising the steps of:

providing a plurality of weld force curves;

determining a governing metal thickness;

determining a total thickness of the sheet metal members;

determining a plurality of joint parameters, including a weld gap parameter, a thickness parameter, a strength parameter, an equalization parameter and a sheet stiffness parameter;

using the plurality of joint parameters to select one of the plurality of weld force curves; and using the governing metal thickness and the selected weld force curve to calculate a weld force parameter.

2. The method of claim 1, wherein the step of determining a weld gap parameter includes the steps of:

determining a design gap parameter based at least partially on a design gap magnitude between the joint members;

determining a panel variation parameter based at least partially on a maximum gap due to panel variation; and adding the design gap parameter and the panel variation parameter.

3. The method of claim 2, wherein the design gap parameter is assigned a first value if the design gap is less than or equal to about 0.90 mm and a second value if the design gap is greater than about 0.90 mm.

4. The method of claim 2, wherein the panel variation parameter is assigned a first value if the gap variation is less than or equal to about 1.50 mm, a second value if the gap variation is greater than about 1.50 mm and less than or equal to about 3.5 mm and a third value if the gap variation is greater than about 3.5 mm.

5. The method of claim 2, further comprising the steps of:

determining a sequence gap parameter; and adding the sequence gap parameter to the design gap parameter and the panel variation parameter.

6. The method of claim 1 wherein the thickness parameter is based on the number of sheet metal members forming the joint.

7. The method of claim 6, wherein the joint is completely comprised of two sheet metal members and the thickness parameter is assigned a first value if the total thickness of the sheet metal members is less than or equal to about 2.0 mm, a second value if the total thickness of the sheet metal members is greater than about 2.0 mm and less than or equal to about 4.0 mm and a third value if the total thickness of the sheet metal members is greater than about 4.0 mm.

8. The method of claim 6, wherein the joint is completely comprised of three sheet metal members and the thickness parameter is assigned a first value if the total thickness of the sheet metal members is less than or equal to about 4.5 mm and a second value if the total thickness of the sheet metal members is greater than about 4.5 mm.

9. The method of claim 1, wherein the strength parameter includes a component indicative of the strength of each of the joint members.

10. The method of claim 9, wherein each of the components is assigned a first value if the tensile strength of a respective joint member is less than about 35,000 lbs., a second value if the tensile strength of the respective joint member is greater than about 35,000 lbs. and less than or equal to about 50,000 lbs. and a third value if the tensile strength of the respective joint member is greater than about 50,000 lbs.

11. The method of claim 1, wherein the equalization parameter is assigned a first value if while forming the resistance spot weld the first electrode is moved into abutment with a first one of the joint members without deflecting any of the joint members an amount in excess of a predetermined amount and the second electrode is moved into abutment with another one of the joint members without deflecting the first one of the joint members an amount which exceeds the predetermined amount.

12. The method of claim 11, wherein the equalization parameter is assigned a second value if while forming the resistance spot weld the first electrode is moved into abutment with the first one of the joint members and deflects any of the joint members an amount in excess of a predetermined amount or the second electrode is moved into abutment with another one of the joint members and deflects the first one of the joint members an amount which exceeds the predetermined amount.

13. The method of claim 11, wherein the equalization parameter is assigned a third value if prior to forming the resistance spot weld the first electrode is not moved into abutment with any of the joint members.

14. The method of claim 1, wherein the sheet stiffness parameter is based on a quantity of pairs of abutting joint members which form the joint.

15. The method of claim 14, wherein the sheet stiffness parameter is based on a relative stiffness component derived for each of the pairs of abutting joint members.

16. The method of claim 15, wherein each relative stiffness component is assigned a first value if a respective pair of abutting joint members may be brought into abutment with a clamping force equal to or less than a first predetermined force magnitude, a second value if a clamping force greater than a first predetermined force magnitude and less than or equal to a second predetermined force magnitude is required to bring the respective pair of abutting joint members into abutment with one another and a third value if a clamping force greater than the second predetermined force magnitude is required to bring the respective pair of abutting joint members into abutment with one another.

17. The method of claim 16, wherein the first clamping force is about 5 lbs. and the second clamping force is about one tenth of a weld clamp force.

18. The method of claim 1, wherein the plurality of joint parameters includes a coating parameter.

19. The method of claim 18, wherein the coating parameter is based on a type of material coated on one or more of the joint members.

20. The method of claim 19, wherein the coating parameter is assigned a first value if each of the joint members is either uncoated or coated with an alloyed zinc coating.

21. The method of claim 18, wherein the coating parameter is based on a coating thickness of a material coated on one or more of the joint members.

22. The method of claim 21, wherein the coating parameter is assigned a first value if any of the material coated on one or more of the joint members is a free zinc having a coating weight of less than about 45 grams/square meter, a second value if any of the material coated on one or more of the joint members is a free zinc having a coating weight of greater than about 45 grams/square meter and less than about 55 grams/square meter, and a third value if any of the material coated on one or more of the joint members is a free zinc having a coating weight of greater than about 55 grams/square meter.

23. The method of claim 1, wherein the plurality of joint parameters includes a tip parameter.

24. The method of claim 23, wherein the tip parameter is assigned a first value if either of the first and second electrodes are less than or equal to about 5/8 inch in diameter, a second value if both the first and second electrodes are greater than about 5/8 inch in diameter and either one of the first and second electrodes are less than or equal to about 3/4 inch in diameter and a third value if both the first and second electrodes are greater than about 3/4 inch in diameter.

* * * * *